US010648091B2

(12) United States Patent
Kuhl et al.

(10) Patent No.: US 10,648,091 B2
(45) Date of Patent: May 12, 2020

(54) REACTOR WITH ADVANCED ARCHITECTURE FOR THE ELECTROCHEMICAL REACTION OF $CO_2$, CO, AND OTHER CHEMICAL COMPOUNDS

(71) Applicants: Opus 12 Incorporated, Berkeley, CA (US); The Regents of the University of California, Oakland, CA (US)

(72) Inventors: Kendra P. Kuhl, Berkeley, CA (US); Etosha R. Cave, Berkeley, CA (US); George Leonard, Berkeley, CA (US)

(73) Assignees: Opus 12 Inc., Berkeley, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 15/586,173

(22) Filed: May 3, 2017

(65) Prior Publication Data

US 2017/0321333 A1 Nov. 9, 2017

Related U.S. Application Data

(60) Provisional application No. 62/331,387, filed on May 3, 2016.

(51) Int. Cl.
*C25B 9/10* (2006.01)
*C25B 3/04* (2006.01)
(Continued)

(52) U.S. Cl.
CPC ............... *C25B 9/10* (2013.01); *C25B 3/04* (2013.01); *C25B 11/0405* (2013.01); *C25B 11/0415* (2013.01); *C25B 13/08* (2013.01)

(58) Field of Classification Search
CPC ......... C25B 3/04; C25B 9/10; C25B 11/0405; C25B 11/0415; C25B 13/08
See application file for complete search history.

(56) References Cited

U.S. PATENT DOCUMENTS 4,042,496 A 8/1977 Tsushima et al.
4,176,215 A * 11/1979 Molnar ................. C08J 5/2237
204/252

(Continued)

FOREIGN PATENT DOCUMENTS

JP H10507305 7/1998
JP 2013-520779 6/2013

(Continued)

OTHER PUBLICATIONS

Lu et al. A selective and efficient electrocatalyst for carbon dioxide reduction. Jan. 30, 2014. Nature Communications. (Year: 2014).*

(Continued)

*Primary Examiner* — Ciel P Thomas
(74) *Attorney, Agent, or Firm* — Weaver Austin Villeneuve & Sampson LLP

(57) ABSTRACT

A platform technology that uses a novel membrane electrode assembly including a cathode layer comprising a reduction catalyst and a first anion-and-cation-conducting polymer, an anode layer comprising an oxidation catalyst and a cation-conducting polymer, a membrane layer comprising a cation-conducting polymer, the membrane layer arranged between the cathode layer and the anode layer and conductively connecting the cathode layer and the anode layer, in a $CO_x$ reduction reactor has been developed. The reactor can be used to synthesize a broad range of carbon-based compounds from carbon dioxide.

22 Claims, 8 Drawing Sheets

(51) Int. Cl.
  *C25B 13/08* (2006.01)
  *C25B 11/04* (2006.01)

(56) References Cited

U.S. PATENT DOCUMENTS

| | | | |
|---|---|---|---|
| 4,609,440 | A | 9/1986 | Frese, Jr. et al. |
| 4,921,586 | A | 5/1990 | Molter |
| 5,601,937 | A | 2/1997 | Isenberg |
| 6,358,651 | B1 | 3/2002 | Chen et al. |
| 7,605,293 | B2 | 10/2009 | Olah et al. |
| 7,608,356 | B2 | 10/2009 | Risen, Jr. et al. |
| 7,704,369 | B2 | 4/2010 | Olah et al. |
| 7,883,817 | B2 | 2/2011 | Hori et al. |
| 8,137,859 | B2 | 3/2012 | Shin et al. |
| 8,268,026 | B2 | 9/2012 | Norbeck et al. |
| 8,277,631 | B2 | 10/2012 | Eastman et al. |
| 8,652,104 | B2 | 2/2014 | Goral et al. |
| 8,652,704 | B2 | 2/2014 | Sano et al. |
| 8,658,016 | B2 | 2/2014 | Lakkaraju et al. |
| 8,721,866 | B2 | 5/2014 | Sivasankar et al. |
| 8,845,875 | B2 | 9/2014 | Teamey et al. |
| 8,845,878 | B2 | 9/2014 | Cole et al. |
| 8,956,990 | B2 | 2/2015 | Masel et al. |
| 9,012,345 | B2 | 4/2015 | Masel et al. |
| 9,145,615 | B2 | 9/2015 | Zhai et al. |
| 9,181,625 | B2 | 11/2015 | Masel et al. |
| 9,193,593 | B2 | 11/2015 | Masel et al. |
| 9,370,773 | B2 | 6/2016 | Masel et al. |
| 9,464,359 | B2 | 10/2016 | Masel et al. |
| 9,481,939 | B2 | 11/2016 | Masel et al. |
| 9,555,367 | B2 | 1/2017 | Masel et al. |
| 9,566,574 | B2 | 2/2017 | Masel et al. |
| 9,580,824 | B2 | 2/2017 | Masel et al. |
| 2003/0059658 | A1* | 3/2003 | Kohler ............... C25B 9/10 429/481 |
| 2005/0239912 | A1 | 10/2005 | Arcella et al. |
| 2012/0171583 | A1* | 7/2012 | Bocarsly ............ H01M 4/8657 429/413 |
| 2013/0105304 | A1 | 5/2013 | Kaczur et al. |
| 2013/0118911 | A1 | 5/2013 | Sivasankar et al. |
| 2013/0345325 | A1 | 12/2013 | Lecomte et al. |
| 2014/0027303 | A1 | 1/2014 | Cole et al. |
| 2014/0206894 | A1 | 7/2014 | Cole et al. |
| 2014/0206896 | A1 | 7/2014 | Sivasankar et al. |
| 2015/0010804 | A1* | 1/2015 | Laramie ............... C25B 11/02 429/144 |
| 2015/0064602 | A1 | 3/2015 | Lee et al. |
| 2016/0107154 | A1 | 4/2016 | Masel et al. |
| 2017/0183789 | A1* | 6/2017 | Matthews ............. C25B 13/08 |
| 2018/0057950 | A1 | 3/2018 | Co et al. |
| 2019/0226103 | A1 | 7/2019 | Kuh et al. |

FOREIGN PATENT DOCUMENTS

| | | |
|---|---|---|
| JP | 2014-525115 A | 9/2014 |
| WO | WO96/11507 | 4/1996 |
| WO | 041872 | 4/2007 |
| WO | WO2011-104542 | 9/2011 |
| WO | 006240 | 1/2012 |
| WO | WO2012-174463 | 12/2012 |
| WO | 006710 | 1/2013 |
| WO | 016447 | 1/2013 |
| WO | 018091 | 1/2014 |
| WO | 032000 | 2/2014 |
| WO | 042781 | 3/2014 |
| WO | 043651 | 3/2014 |
| WO | 046797 | 3/2014 |
| WO | 160529 | 10/2014 |
| WO | 035521 | 3/2015 |
| WO | 014635 | 1/2017 |

OTHER PUBLICATIONS

Delacourt, Charles; et al.Design of Electrochemical Cell Makeing Syngas (CO + H2) from CO2 and H2O Reduction at Room Temperature, J. Electrochem. Soc. 2008 155(1): B42-B49.

Delacourt, Charles, Electrochemical reduction of carbon dioxide and water to syngas (CO + H2) at room temperature, Environmental Energy Technologies Division,Lawrence Berkeley National Laboratory Department of Chemical Engineering and University of California Berkeley, Postdoc Manuscript, 2006-2007.

Srinivasan, S. et al., Advances in Solid Polymer Electrolyte Fuel Cell Technology with Low Platinum Loading Electrodes, Journal of Power Sources, 22 (1988) pp. 359-375.

Aeshala, L.M. et al., Effect of solid polymer electrolyte on electrochemical reduction of CO2, Separation and Purification Technology 94, (2012), pp. 131-137.

Kriescher, Stefanie M.A. et al, A membrane electrode assembly for the electrochemical synthesis of hydrocarbons from CO2)g) and Ho2(g), Electrochemistry Communications, 50 (2015), pp. 64-68.

Zhu, Wenlei et al., Monodisperse Au Nanoparticles for Selective Electrocatalytic Reduction of CO2 to CO,Journal of the American Chemical Society, 2013, 135, pp. 16833-16836.

Zhu, Wenlei et al., Active and Selective Conversion of CO2 to CO on Ultrathin Au Nanowires, Journal of American Chemical Society, 2014, 136, pp. 16132-16135.

Spets et al. Direct Glucose Fuel Cell With Anion Exchange Membrane in the Near Neutral State Electrolyte, International Journal of Electrochemical Science 7, 11696-11705, Dec. 1, 2012, entire doucment, http. electrochemsci.org/papers/vol7/71211696.pdf.

Pătru, A., et al., "Design Principles of Bipolar Electrochemical Co-Electrolysis Cells for Efficient Reduction of Carbon Dioxide from Gas Phase at Low Temperature," *Journal of the Electrochemical Society*, 166 (2), (2019), pp. F34-F43.

Office Action issued in dated Nov. 1, 2018, in U.S. Appl. No. 15/586,182.

Final Office Action issued in dated Apr. 2, 2019, in U.S. Appl. No. 15/586,182.

International Search Report and Written Opinion dated Aug. 7, 2017, in PCT Application No. PCT/US2017/030935.

International Search Report and Written Opinion dated Sep. 13, 2017, in PCT Application No. PCT/US2017/030936.

Preliminary Report on Patentability dated Nov. 6, 2018, in PCT Application No. PCT/US2017/030936.

"International Search Report and Written Opinion of the ISA, dated Apr. 30, 2019, for application No. PCT/US19/14586."

CA Office Action dated Oct. 15, 2019, in Application No. 3,022,807.

EP Search Report dated Dec. 2, 2019, in Application No. 17793299.3.

Office Action dated Dec. 30, 2019, in U.S. Appl. No. 15/586,182.

EP Search Report dated Dec. 4, 2019, in Application No. 17793300.9.

JP Office Action dated Jan. 28, 2020, in Application No. 2018-558138.

JP Office Action dated Jan. 28, 2020, in Application No. 2018-558130.

\* cited by examiner

REACTOR WITH ADVANCED ARCHITECTURE FOR THE ELECTROCHEMICAL REACTION OF CO$_2$, CO, AND OTHER CHEMICAL COMPOUNDS

CROSS-REFERENCE TO RELATED APPLICATIONS

This application claims the benefit of U.S. Provisional Application No. 62/331,387, filed 3 May 2016, which is incorporated in its entirety by this reference.

STATEMENT OF GOVERNMENT SUPPORT

The Government has rights in this invention pursuant to a User Agreement FP00003032 between Opus 12, Incorporated and The Regents of the University of California, which manages and operates Ernest Orlando Lawrence Berkeley National Laboratory for the US Department of Energy under Contract No. DE-AC02-05CH11231.

TECHNICAL FIELD

The present disclosure generally relates to the field of electrochemical reactions, and more particularly, to devices and methods for electrochemically reducing CO$_x$ (CO$_2$, CO, or combinations thereof) into carbon-containing chemical compounds.

BACKGROUND

Anthropogenic CO$_2$ emissions have been linked to climate change.

As a response to increasing concerns about global greenhouse gas emissions, technologies that can recycle CO$_2$ into high-value products have received growing interest.

Electrochemical reduction of CO$_x$ (CO$_2$, CO, or combinations thereof) combines just three inputs: CO$_x$, a source of protons, and electricity, and converts them into fuels and chemicals such as methanol, ethanol, carbon monoxide or acetic acid. However, it has not been possible to achieve industrial-scale production of such fuels and chemicals. One of the key barriers has been the lack of a suitable electrochemical reactor. The largest barrier to achieving an efficient reactor design with a high production rate is the poor transport of CO$_x$ to the catalyst surface in the reactor due to the low solubility of CO$_x$ in aqueous solutions and the inability to control the competing water reduction reaction that leads to hydrogen production.

This disclosure describes a new electrochemical reactor for reduction of CO$_x$, which overcomes this barrier. Gas-phase CO$_x$, as opposed to CO$_x$ dissolved in water, is fed to the reactor to achieve better transport and high product production rates. The ion, conducting polymer surrounding the CO$_x$ conversion catalyst minimizes the competing hydrogen formation reaction. The reactor has high energy efficiency, high current density, fast response time, and proven robustness, while also providing flexibility in the kinds of chemical products it can produce.

BRIEF DESCRIPTION OF THE FIGURES

The foregoing aspects and others will be readily appreciated by the skilled artisan from the following description of illustrative embodiments when read in conjunction with the accompanying drawings.

SUMMARY

Figure 1:
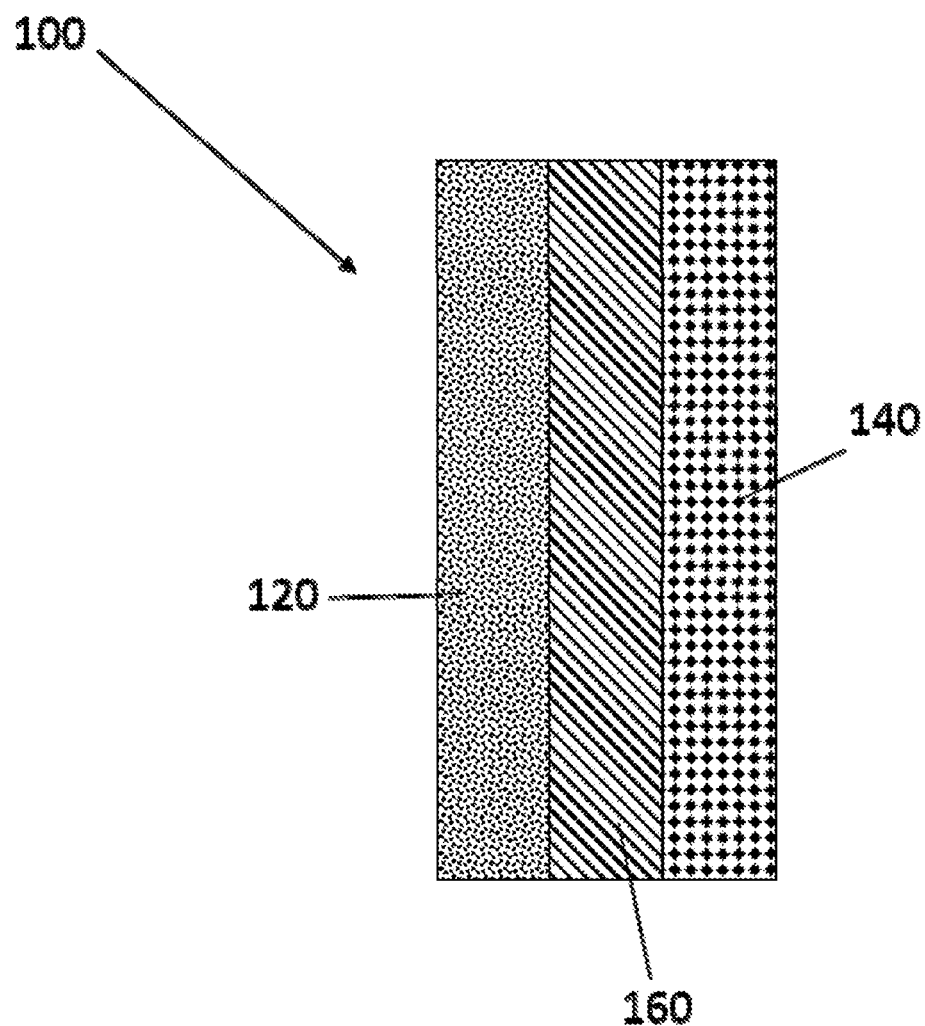
FIG. 1 shows a standard membrane electrode assembly used in a conventional water electrolysis reactor, which makes hydrogen and oxygen.

In one embodiment of the invention, a membrane electrode assembly (MEA) for use in a CO$_x$ reduction reactor is provided. The MEA has a cathode layer comprising reduction catalyst and a first ion-conducting polymer and an anode layer comprising oxidation catalyst and a second ion-conducting polymer. There is a polymer electrolyte membrane comprising a third ion-conducting polymer between the anode layer and the cathode layer. The polymer electrolyte membrane provides ionic communication between the anode layer and the cathode layer. There is also a cathode buffer layer comprising a fourth ion-conducting polymer between the cathode layer and the polymer electrolyte membrane, the cathode buffer. There are three classes of ion-conducting polymers: anion-conductors, cation-conductors, and cation-and-anion-conductors. At least two of the first, second, third, and fourth ion-conducting polymers are from different classes of ion-conducting polymers.

In one arrangement, the reduction catalyst is selected from the group consisting of V, Cr, Mn, Fe, Co, Ni, Cu, Sn, Zr, Nb, Mo, Au, Ru, Rh, Pd, Ag, Cd, Hf, Ta, W, Re, Ir, Pt, Hg, Al, Si, In, Ga, Tl, Pb, Bi, Sb, Te, Sm, Tb, Ce, and Nd, and combinations thereof. The reduction catalyst can further comprise conductive support particles selected from the group consisting of carbon, boron-doped diamond, fluorine-doped tin oxide, and combinations thereof.

In one arrangement, the cathode layer comprises between 10 and 90 wt % first ion-conducting polymer. The first ion-conducting polymer can comprise at least one ion-conducting polymer that is an anion-conductor.

The first ion-conducting polymer can comprise one or more covalently-bound, positively-charged functional groups configured to transport mobile negatively-charged ions. The first ion-conducting polymer can be selected from the group consisting of aminated tetramethyl polyphenylene; poly(ethylene-co-tetrafluoroethylene)-based quaternary ammonium polymer; quaternized polysulfone), and blends thereof. The first ion-conducting polymer can be configured to solubilize salts of bicarbonate or hydroxide.

The first ion-conducting polymer can comprise at least one ion-conducting polymer that is a cation-and-anion-conductor. The first ion-conducting polymer can be selected from the group consisting of polyethers that can transport cations and anions and polyesters that can transport cations and anions. The first ion-conducting polymer can be selected from the group consisting of polyethylene oxide, polyethylene glycol, polyvinylidene fluoride, and polyurethane.

In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

In one arrangement, the anode layer comprises between 5 and 95 wt % second ion-conducting polymer. The second ion-conducting polymer can comprise at least one ion-conducting polymer that is a cation-conductor.

The second ion-conducting polymer can comprise one or more polymers that contain covalently-bound, negatively-charged functional groups configured to transport mobile positively-charged ions. The second ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

In one arrangement, the third ion-conducting polymer comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

In one arrangement, the cathode buffer layer has a porosity between 10 and 90%.

In one arrangement, the fourth ion-conducting polymer comprises at least one ion-conducting polymer that is an anion-conductor. The fourth ion-conducting polymer can comprise one or more covalently-bound, positively-charged functional groups configured to transport mobile negatively-charged ions. The fourth ion-conducting polymer can be selected from the group consisting of aminated tetramethyl polyphenylene; poly(ethylene-co-tetrafluoroethylene)-based quaternary ammonium polymer; quaternized polysulfone, and blends thereof.

In one arrangement, the first ion-conducting polymer and the fourth ion-conducting polymer are from the same class. In one arrangement, the second ion-conducting polymer and the third ion-conducting polymer are from the same class.

In one arrangement, the membrane electrode assembly further comprises an anode buffer layer between the anode layer and the polymer electrolyte membrane, the anode buffer layer comprising a fifth ion-conducting polymer.

In another arrangement, the fifth ion-conducting polymer of the membrane electrode assembly comprises at least one ion-conducting polymer that is a cation-conductor. The fifth ion-conducting polymer can comprise one or more covalently-bound, negatively-charged functional groups configured to transport mobile positively-charged ions.

The fifth ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. The second ion-conducting polymer and the fifth ion-conducting polymer can be from the same class.

In one arrangement, the anode buffer layer has a porosity between 10% and 90%.

In another embodiment of the invention, a membrane electrode assembly (MEA) for use in a $CO_x$ reduction reactor is provided. The MEA has a cathode layer comprising reduction catalyst and a first ion-conducting polymer and an anode layer comprising oxidation catalyst and a second ion-conducting polymer. There is a polymer electrolyte membrane between the anode layer and the cathode layer. The polymer electrolyte membrane comprises a third ion-conducting polymer and provides ionic communication between the anode layer and the cathode layer. There are three classes of ion-conducting polymers: anion-conductors, cation-conductors, and cation-and-anion-conductors. At least two of the first, second, and third ion-conducting polymers are from different classes of ion-conducting polymers.

In another embodiment of the invention, $CO_x$ reduction reactor is provided. The reactor has at least one electrochemical cell, which comprises any of the membrane electrode assemblies described herein. The reactor also has a cathode support structure adjacent to the cathode, the cathode support structure comprising a cathode polar plate, at least one cathode gas diffusion layer, at least one inlet and at least one outlet. There is also an anode cell support structure adjacent to the anode. The anode support structure comprises an anode polar plate and at least one anode gas diffusion layer, at least one inlet and at least one outlet.

In yet another embodiment of the invention, a method of operating a $CO_x$ reduction reactor is provided. The method results in production of reaction products. The steps of the process include: providing an electrochemical reactor comprising at least one electrochemical cell comprising a membrane electrode assembly as described above, a cathode support structure adjacent to the cathode, the cathode support structure comprising a cathode polar plate, at least one cathode gas diffusion layer, at least one gas inlet and at least one gas outlet, and an anode cell support structure adjacent to the anode, the anode support structure comprising an anode polar plate and at least one anode gas diffusion layer, at least one inlet and at least one outlet; applying a DC voltage to the cathode polar plate and the anode polar plate; supplying one or more oxidation reactants to the anode and allowing oxidation reactions to occur; supplying one or more reduction reactants to the cathode and allowing reduction reactions to occur; collecting oxidation reaction products from the anode; and collecting reduction reaction products from the cathode.

The oxidation reactants can be selected from the group consisting of hydrogen, methane, ammonia, water, or combinations thereof. In one arrangement, the oxidation reactant is water.

The reduction reactants can be selected from the group consisting of carbon dioxide, carbon monoxide, and combinations thereof. In one arrangement, the reduction reactant is carbon dioxide.

DESCRIPTION OF THE PREFERRED EMBODIMENTS

The preferred embodiments are illustrated in the context of reduction of $CO_x$ ($CO_2$, CO, or combinations thereof) to produce useful chemicals and fuels. The skilled artisan will readily appreciate, however, that the materials and methods disclosed herein will have application in a number of other contexts where reduction reactions are desirable, particularly where production of a variety of chemicals in a variety of reaction conditions is important. The reactor used to reduce $CO_x$ could also be used to reduce other compounds, including but not limited to: $N_2$, $SO_x$, $NO_x$, acetic acid, ethylene, $O_2$ and any other reducible compound or combinations thereof.

All publications referred to herein are incorporated by reference in their entirety for all purposes as if fully set forth herein.

Table 1 lists some abbreviations that are used throughout this application.

TABLE 1

| Abbreviation | Description |
| --- | --- |
| $CO_x$ | $CO_2$, CO or a combination thereof |
| CRR | $CO_x$ reduction reactor |
| MEA | membrane electrode assembly |
| PEM | polymer electrolyte membrane |

The term, "ion-conducting polymer" is used herein to describe a polymer electrolyte having greater than approximately 1 mS/cm specific conductivity for anions and/or cations. The term, "anion-conductor," describes an ion-conducting polymer that conducts anions primarily (although there will still be some small amount of cation conduction) and has a transference number for anions greater than approximately 0.85 at around 100 micron thickness. The term, "cation-conductor," describes an ion-conducting polymer that conducts cations primarily (although there will still be some small amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material.

Hydration is useful in effecting ion conduction for most ion-conducting polymers. Humidification of $CO_x$ or anode feed material can be used for the delivery of liquid water to the MEA to maintain hydration of ion-conducting polymers.

In one embodiment of the invention, a $CO_x$ reduction reactor (CRR) that uses a novel membrane electrode assembly in an electrochemical cell has been developed. Table 2 lists some examples of useful chemicals that can be produced from $CO_x$ in such a reactor.

TABLE 2

Exemplary $CO_2$ and CO Reduction Products

| Formic Acid | Carbon Monoxide | Methanol |
| --- | --- | --- |
| Glyoxal | Methane | Acetic Acid |
| Glycolaldehyde | Ethylene Glycol | Acetaldehyde |
| Ethanol | Ethylene | Hydroxyacetone |
| Acetone | Allyl Alcohol | Propionaldehyde |
| n-Propanol | Syngas | |

Membrane Electrode Assembly

A conventional membrane electrode assembly (MEA) 100 used for water electrolysis to make hydrogen and oxygen is shown in FIG. 1. The MEA 100 has a cathode 120 and an anode 140 separated by an ion-conducting polymer layer 160 that provides a path for ions to travel between the cathode 120 and the anode 140. The cathode 120 and the anode 140 each contain ion-conducting polymer, catalyst particles, and electronically conductive catalyst support. The ion-conducting polymer in the cathode 120, anode 140, and ion-conducting polymer layer 160 are either all cation-conductors or all anion-conductors.

The conventional MEA 100 is not suitable for use in a CRR. When all of the ion-conducting polymers are cation-conductors, the environment favors water reduction to make hydrogen in an unwanted side reaction. The production of hydrogen lowers the rate of $CO_x$ product production and lowers the overall efficiency of the process. When all of the ion-conducting polymers are anion-conductors, then $CO_2$ reacts with hydroxide anions in the ion-conducting polymer to form bicarbonate anions. The electric field in the reactor moves the bicarbonate anions from the cathode side of the cell to the anode side of the cell. At the anode, bicarbonate anions can decompose back into $CO_2$ and hydroxide. This results in the net movement of $CO_2$ from the cathode to the anode of the cell, where it does not react and is diluted by the anode reactants and products. This loss of $CO_2$ to the anode side of the cell reduces the efficiency of the process.

Figure 2:
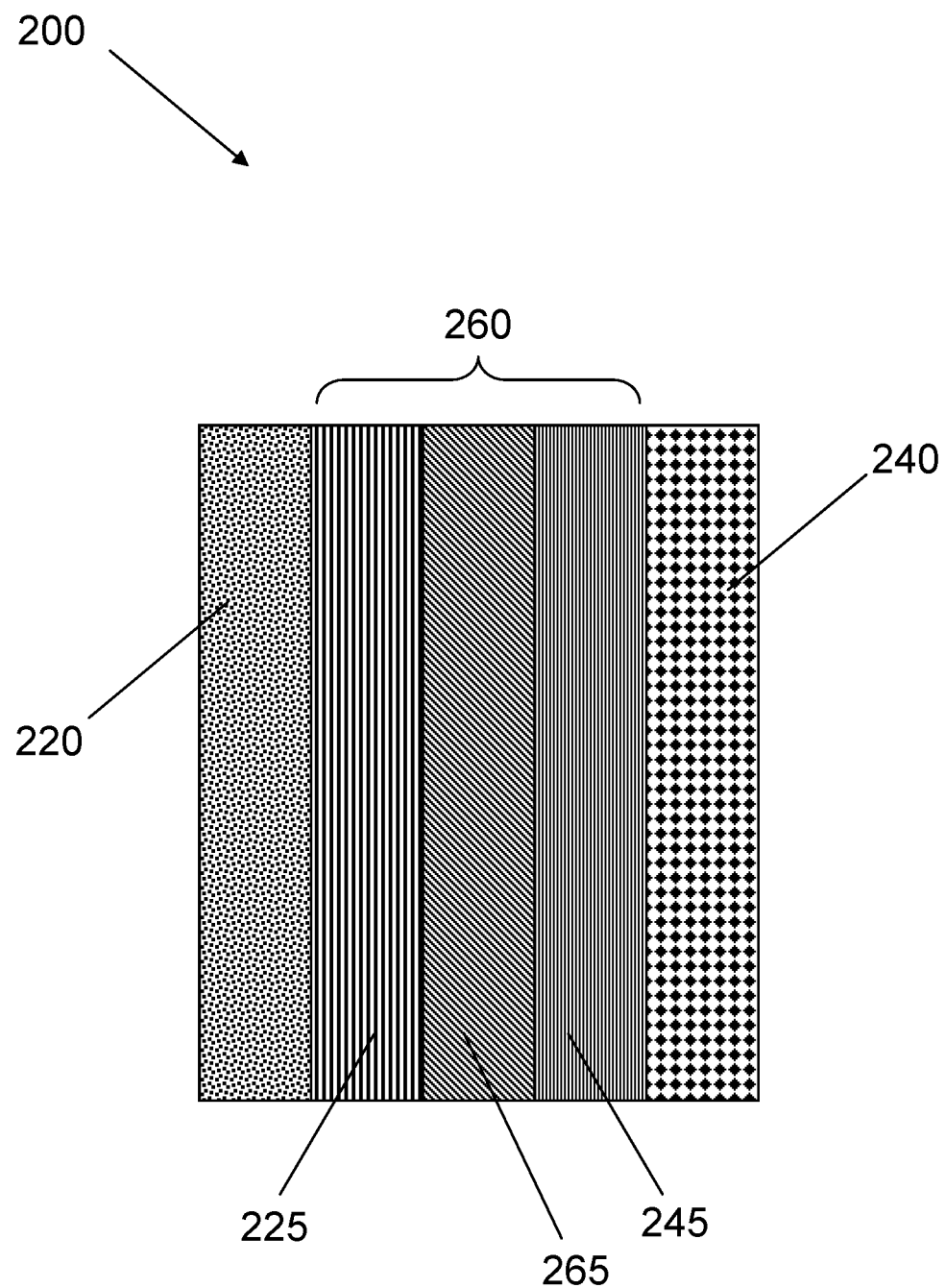
FIG. 2 is a schematic illustration of a membrane electrode assembly for use in a new CO$_x$ reduction reactor (CRR), according to an embodiment of the invention.

A new membrane electrode assembly (MEA) 200 for use in a CRR is shown in FIG. 2, according to an embodiment of the invention. The MEA 200 has a cathode 220 and an anode 240 separated by an ion-conducting polymer layer 260 that provides a path for ions to travel between the cathode 220 and the anode 240. In general, it is especially useful if the cathode and anode layers of the MEA are porous in order to facilitate gas and fluid transport and to maximize the amount of catalyst surface area that is available for reaction.

The cathode 220 contains a blend of reduction catalyst particles, electronically-conductive support particles that provide support for the reduction catalyst particles, and a cathode ion-conducting polymer. There are tradeoffs in choosing the amount of cathode ion-conducting polymer in the cathode. It is important to include enough cathode ion-conducting polymer to provide sufficient ionic conductivity. But it is also important for the cathode to be porous so that reactants and products can move through it easily and to maximize the amount of catalyst surface area that is available for reaction. In various arrangements, the cathode ion-conducting polymer makes up somewhere in the range between 30 and 70 wt %, between 20 and 80 wt %, or between 10 and 90 wt %, of the material in the cathode layer, or any other suitable range. The wt % of ion-conducting polymer in the cathode is selected to result in the cathode layer porosity and ion-conductivity that gives the highest current density for $CO_x$ reduction. Examples of materials that can be used for the reduction catalyst particles include but are not limited to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof. Catalysts can be in the form of nanoparticles that range in size from approximately 1 to 100 nm or particles that range in size from approximately 0.2 to 10 nm or particles in the size range of approximately 1-1000 nm or any other suitable range.

The conductive support particles in the cathode can be carbon particles in various forms. Other possible conductive support particles include boron-doped diamond or fluorine-doped tin oxide. In one arrangement, the conductive support particles are Vulcan carbon. The conductive support particles can be nanoparticles. The size range of the conductive support particles is between approximately 20 nm and 1000 nm or any other suitable range. It is especially useful if the conductive support particles are compatible with the chemicals that are present in the cathode 220 when the CRR is operating, are reductively stable, and have a high hydrogen production overpotential so that they do not participate in any electrochemical reactions.

Figure 3:
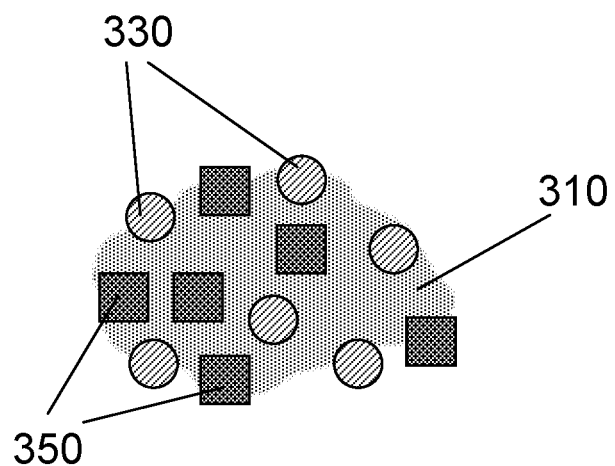
FIG. 3 is a schematic drawing that shows a possible morphology for two different kinds of catalysts supported on a catalyst support particle, according to an embodiment of the invention.

In general, such conductive support particles are larger than the reduction catalyst particles, and each conductive support particle can support many reduction catalyst particles. FIG. 3 is a schematic drawing that shows a possible morphology for two different kinds of catalysts supported on a catalyst support particle 310, such as a carbon particle. Catalyst particles 330 of a first type and second catalyst particles 350 of a second type are attached to the catalyst support particle 310. In various arrangements, there is only one type of catalyst particle or there are more than two types of catalyst particles attached to the catalyst support particle 310.

Again, with reference to FIG. 2, the anode 240 contains a blend of oxidation catalyst and an anode ion-conducting polymer. There are tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

There are a variety of oxidation reactions that can occur at the anode depending on the reactant that is fed to the anode and the anode catalyst(s). Table 3 lists oxidation reactions that can occur at the anode and some exemplary catalysts that support those reactions. The oxidation catalyst can be in the form of a structured mesh or can be in the form of particles. If the oxidation catalyst is in the form of particles, the particles can be supported by electronically-conductive support particles. The conductive support particles can be nanoparticles. It is especially useful if the conductive support particles are compatible with the chemicals that are present in the anode 240 when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. An example of such an arrangement is shown in FIG. 3 and is discussed above. In one arrangement, the oxidation catalyst is iridium ruthenium oxide. Examples of other materials that can be used for the oxidation catalyst include, but are not limited to, those shown in Table 3. It should be understood that many of these metal catalysts can be in the form of oxides, especially under reaction conditions.

TABLE 3

| Feed Material | Anode Oxidation Reaction | Exemplary Catalysts |
| --- | --- | --- |
| Hydrogen | $H_2 \rightarrow 2H^+ + 2e^-$ | Pt, Ni, Ru, other transition metals, and alloys and oxides thereof |
| Methane | $CH_4 + H_2O \rightarrow CH_3OH + 2H^+ + 2e^-$ | Pd, Pd alloys and oxides thereof |
| Methane | $CH_4 + 2H_2O \rightarrow CO_2 + 8H^+ + 8e^-$ | Pt, Au, Pd, and alloys and oxides thereof |
| Ammonia | $2NH_3 \rightarrow N_2 + 6H^+ + 6e^-$ | Ru, Pt and oxides thereof |
| Water | $2H_2O \rightarrow O_2 + 4H^+ + 4e^-$ | Ir, IrRu, PtIr, Pt, Au, Ni, NiFe, Mn, Stainless steel and oxides thereof |

The ion-exchange layer 260 can include three sublayers: a cathode buffer layer 225, a polymer electrolyte membrane (PEM) 265, and an optional anode buffer layer 245. Some layers in the ion-exchange layer can be porous, but it is useful if at least one layer is nonporous so that reactants and products of the cathode cannot pass to the anode and vice versa.

The polymer electrolyte membrane 265 has high ionic conductivity (greater than about 1 mS/cm), and is mechanically stable. Mechanical stability can be evidenced in a variety of ways such as through high tensile strength, modulus of elasticity, elongation to break, and tear resistance. Many commercially-available membranes can be used for the polymer electrolyte membrane 265. Examples include, but are not limited to, various Nafion® formulations, GORE-SELECT, FumaPEM® (PFSA) (FuMA-Tech GmbH), and Aquivion® (PFSA) (Solvay).

It is important to note that when the polymer electrolyte membrane 265 is a cation conductor and is conducting protons, it contains a high concentration of protons during operation of the CRR, while the cathode 220 operates best when a low concentration of protons is present. It can be useful to include a cathode buffer layer 225 between the polymer electrolyte membrane 265 and the cathode 220 to provide a region of transition from a high concentration of protons to a low concentration of protons. In one arrangement, the cathode buffer layer 225 is an ion-conducting polymer with many of the same properties as the ion-conducting polymer in the cathode 220. The cathode buffer layer 225 provides a region for the proton concentration to transition from the polymer electrolyte membrane 265, which has a high concentration of protons to the cathode 220, which has a low proton concentration. Within the cathode buffer layer 225, protons from the polymer electrolyte membrane 265 encounter anions from the cathode 220, and they neutralize one another. The cathode buffer layer 225 helps ensure that a deleterious number of protons from the polymer electrolyte membrane 265 does not reach the cathode 220 and raise the proton concentration. If the proton concentration of the cathode 220 is too high, $CO_x$ reduction does not occur. High proton concentration is considered to be in the range of approximately 10 to 0.1 molar and low concentration is considered to be less than approximately 0.01 molar.

The cathode buffer layer 225 can include a single polymer or multiple polymers. If the cathode buffer layer 225 includes multiple polymers, the multiple polymers can be mixed together or can be arranged in separate, adjacent layers. Examples of materials that can be used for the cathode buffer layer 225 include, but are not limited to, FumaSep FAA-3, Tokuyama anion exchange membrane material, and polyether-based polymers, such as polyethylene oxide (PEO), and blends thereof. The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 µm, between 300 nm and 75 µm, between 500 nm and 50 µm, or any suitable range.

It can be useful if some or all of the following layers are porous: the cathode 220, the cathode buffer layer 225, the anode 240 and the anode buffer layer 245. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 µm, between 10 nm and 100 µm, or any suitable size range. In other arrangements, porosity is achieved by using particular processing methods when the layers are formed. One example of such a processing method is laser ablation, where nano to micro-sized channels are formed in the layers. Another example is mechanically puncturing a layer to form channels through it.

In some CRR reactions, bicarbonate is produced at the cathode 220. It can be useful if there is a polymer that blocks bicarbonate transport somewhere between the cathode 220 and the anode 240, to prevent migration of bicarbonate away from the cathode. It can be that bicarbonate takes some $CO_2$ with it as it migrates, which decreases the amount of $CO_2$ available for reaction at the cathode. In one arrangement, the polymer electrolyte membrane 265 includes a polymer that blocks bicarbonate transport. Examples of such polymers include, but are not limited to, Nafion® formulations, GORE-SELECT, FumaPEM® (PFSA) (FuMA-Tech GmbH), and Aquivion® (PFSA) (Solvay). In another arrangement, there is an anode buffer layer 245 between the polymer electrolyte membrane 265 and the anode 240, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion® (PFSA) (Solvay). Of course, including a bicarbonate blocking feature in the ion-exchange layer 260 is not particularly desirable if there is no bicarbonate in the CRR.

In another embodiment of the invention, the anode buffer layer 245 provides a region for proton concentration to transition between the polymer electrolyte membrane 265 to the anode 240. The concentration of protons in the polymer electrolyte membrane 265 depends both on its composition and the ion it is conducting. For example, a Nafion polymer electrolyte membrane 265 conducting protons has a high proton concentration. A FumaSep FAA-3 polymer electrolyte membrane 265 conducting hydroxide has a low proton concentration. For example, if the desired proton concentration at the anode 240 is more than 3 orders of magnitude different from the polymer electrolyte membrane 265, then an anode buffer layer 245 can be useful to effect the transition from the proton concentration of the polymer electrolyte membrane 265 to the desired proton concentration of the anode. The anode buffer layer 245 can include a single polymer or multiple polymers. If the anode buffer layer 245 includes multiple polymers, the multiple polymers can be mixed together or can be arranged in separate, adjacent layers. Materials that can be useful in providing a region for the pH transition include, but are not limited to, Nafion, FumaSep FAA-3, Tokuyama anion exchange polymer, and polyether-based polymers, such as polyethylene oxide (PEO), and blends thereof. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 4 below. In one embodiment of the invention, at least one of the ion-conducting polymers in the cathode 220, anode 240, polymer electrolyte membrane 265, cathode buffer layer 225, and anode buffer layer 245 is from a class that is different from at least one of the others.

TABLE 4

Ion-Conducting Polymers

| Class | Description | Common Features | Examples |
|---|---|---|---|
| A. Anion-conducting | Greater than approximately 1 mS/cm specific conductivity for anions, which have a transference number greater than approximately 0.85 at | Positively charged functional groups are covalently bound to the polymer backbone | aminated tetramethyl polyphenylene; poly(ethylene-co-tetrafluoro-ethylene)-based quaternary ammonium polymer; quaternized polysulfone |
| B. Conducts both anions and cations | Greater than approximately 1 mS/cm conductivity for ions (including both cations and anions), which have a transference number between approximately | Salt is soluble in the polymer and the salt ions can move through the polymer material | polyethylene oxide; polyethylene glycol; poly (vinylidene fluoride); polyurethane |
| C. Cation-conducting | Greater than approximately 1 mS/cm specific conductivity for cations, which have a transference number greater than approximately 0.85 at | Negatively charged functional groups are covalently bound to the polymer backbone | perfluoro-sulfonic acid polytetra-fluoroethylene co-polymer; sulfonated poly(ether ether ketone); poly(styrene sulfonic acid-co-maleic acid) |

Some Class A ion-conducting polymers are known by tradenames such as 2259-60 (Pall RAI), AHA by Tokuyama Co, Fumasep® FAA-3 (fumatech GbbH), Morgane ADP by Solvay, or Tosflex® SF-17 by Tosoh anion exchange membrane material. Some Class C ion-conducting polymers are known by tradenames such as various formulations of Nafion® (DuPont™), GORE-SELECT® (Gore), Fumapem® (fumatech GmbH), and Aquivion® PFSA (Solvay).

Figure 4:
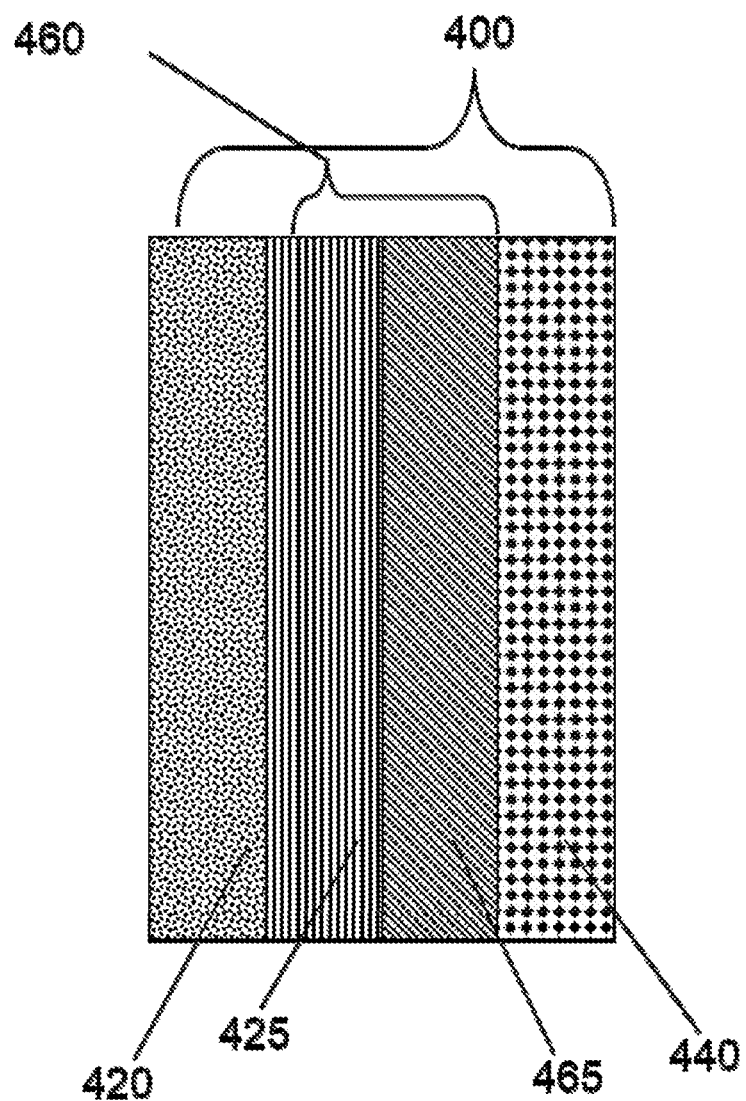
FIG. 4 is a schematic illustration of a membrane electrode assembly for use in a new CRR, according to another embodiment of the invention.

A new membrane electrode assembly (MEA) 400 for use in a CRR is shown in FIG. 4, according to another embodiment of the invention. The MEA 400 has a cathode 420, an anode 440, and an ion-conducting polymer layer 460. The ion-conducting polymer layer 460 contains an ion-conducting polymer membrane 465 and a cathode buffer layer 425. The anode 440 and the ion-conducting polymer membrane 465 contain ion-conducting polymers that are cation conductors, and the ion-conducting polymer membrane 465 does not allow for appreciable amounts of bicarbonate to reach the anode 440, so no anode buffer layer is used here.

Figure 5:
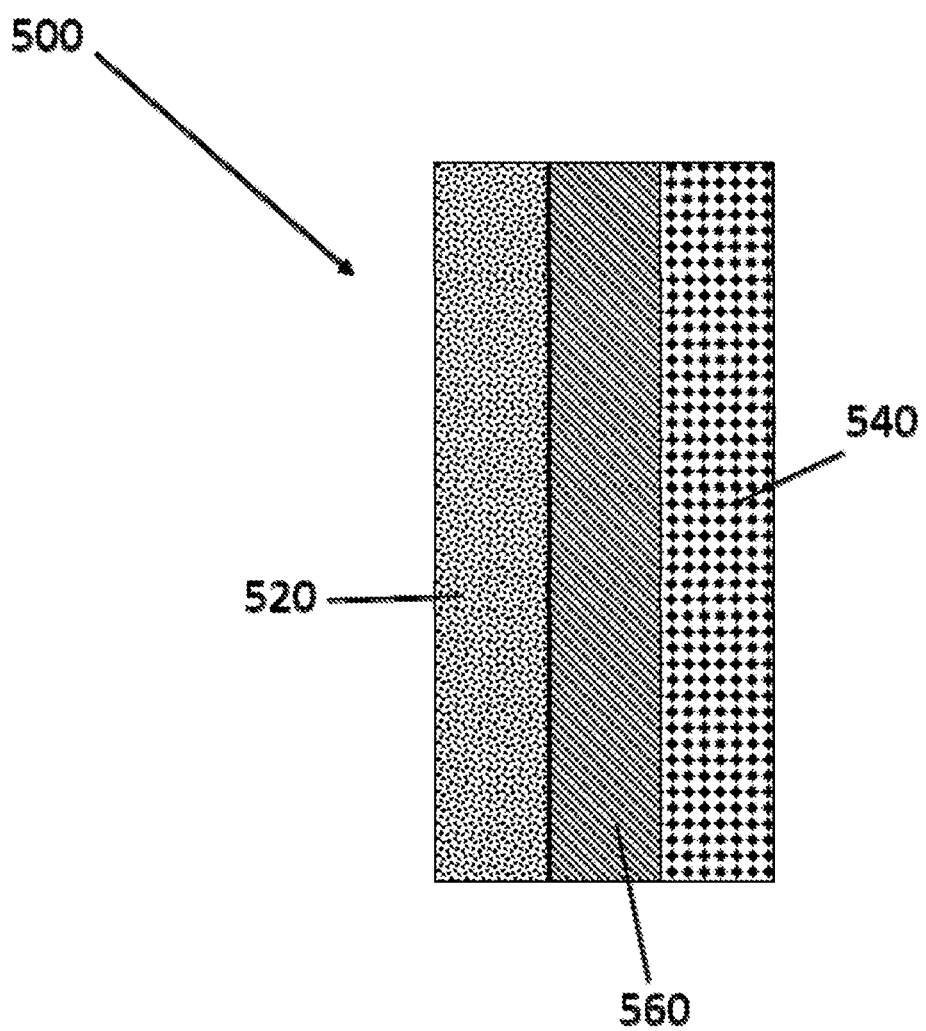
FIG. 5 is a schematic drawing that shows the membrane electrode assembly for use in a new CRR, according to yet another embodiment of the invention.

A new membrane electrode assembly (MEA) 500 for use in a CRR is shown in FIG. 5, according to yet another embodiment of the invention. The MEA 500 has a cathode 520, an anode 540, and an ion-conducting polymer membrane 560. In this arrangement, the transition from a high proton concentration within the ion-conducting polymer membrane 560 to a low proton concentration in the cathode layer is achieved at the interface of the cathode layer 520 and the ion-conducting polymer membrane 560, so no additional buffer layer between these two layers is used. The ability to achieve the difference in proton concentration without the buffer layer depends on the kinds of ion-conducting polymers used in the cathode layer 520 and in the ion-conducting polymer membrane 560 and the way in which the ion-conducting polymers mix at the interface of the layers.

In a specific example, the membrane electrode assembly includes a cathode layer including a reduction catalyst and a first anion-and-cation-conducting polymer, an anode layer including an oxidation catalyst and a first cation-conducting polymer, a membrane layer including a second cation-conducting polymer (e.g., Nafion 115, Nafion 117, and/or Nafion 211) and arranged between the cathode layer and the anode layer to conductively connect the cathode layer and the anode layer, and a cathode buffer layer including a second anion-and-cation conducting polymer and arranged between the cathode layer and the membrane layer to conductively connect the cathode layer and the membrane layer.

In a related example, the cathode buffer layer further includes FumaSep FAA-3. In another related example, the cathode layer further includes FumaSep FAA-3.

In another specific example, the membrane electrode assembly includes a cathode layer including a reduction catalyst and a first anion-and-cation conducting polymer (e.g., polyethylene glycol), an anode layer including an oxidation catalyst and a first cation-conducting polymer (e.g., tetrafluoroethylene-perfluoro-3,6-dioxa-4-methyl-7-octenesulfonic acid copolymer), a membrane layer comprising a second cation-conducting polymer (e.g., tetrafluoroethylene-perfluoro-3,6-dioxa-4-ethyl-7-octenesulfonic acid copolymer) and arranged between the cathode layer and the anode layer to conductively connect the cathode layer and the anode layer, and a cathode buffer layer including FumaSep FAA-3 and arranged between the cathode layer and the membrane layer to conductively connect the cathode layer and the membrane layer.

In a related example, the cathode buffer layer further includes a second anion-and-cation conducting polymer (e.g., polyethylene glycol).

In another specific example, the membrane electrode assembly includes a cathode layer including a reduction catalyst and FumaSep FAA-3, an anode layer including an oxidation catalyst and a first cation-conducting polymer (e.g., Nafion 115, Nafion 117, and/or Nafion 211), and a membrane layer including a second cation-conducting polymer (e.g., Nafion 115, Nafion 117, and Nafion 211) and arranged between the cathode layer and the anode layer to conductively connect the cathode layer and the anode layer.

In a related example, the membrane electrode assembly includes a cathode buffer layer including a first anion-conducting polymer (e.g., FumaSep FAA-3) and arranged between the cathode layer and the membrane layer to conductively connect the cathode layer and the membrane layer.

In another related example, the cathode layer further includes a first anion-and-cation conducting polymer.

In another specific example, the membrane electrode assembly includes a cathode layer including a reduction catalyst and FumaSep FAA-3, an anode layer comprising an oxidation catalyst and a first cation-conducting polymer (e.g., Nafion 115, Nafion 117, and/or Nafion 211), a membrane layer including a second cation-conducting polymer (e.g., Nafion 115, Nafion 117, and/or Nafion 211) and arranged between the cathode layer and the anode layer to conductively connect the cathode layer and the anode layer, and a cathode buffer layer including FumaSep FAA-3 and arranged between the cathode layer and the membrane layer to conductively connect the cathode layer and the membrane layer.

In a related example, the cathode buffer layer further includes an anion-and-cation conducting polymer. In another related example, the cathode layer further includes an anion-and-cation conducting polymer. In another related example, both the cathode buffer layer and the cathode layer include an anion-and-cation conducting polymer.

$CO_x$ Reduction Reactor (CRR)

Figure 6:
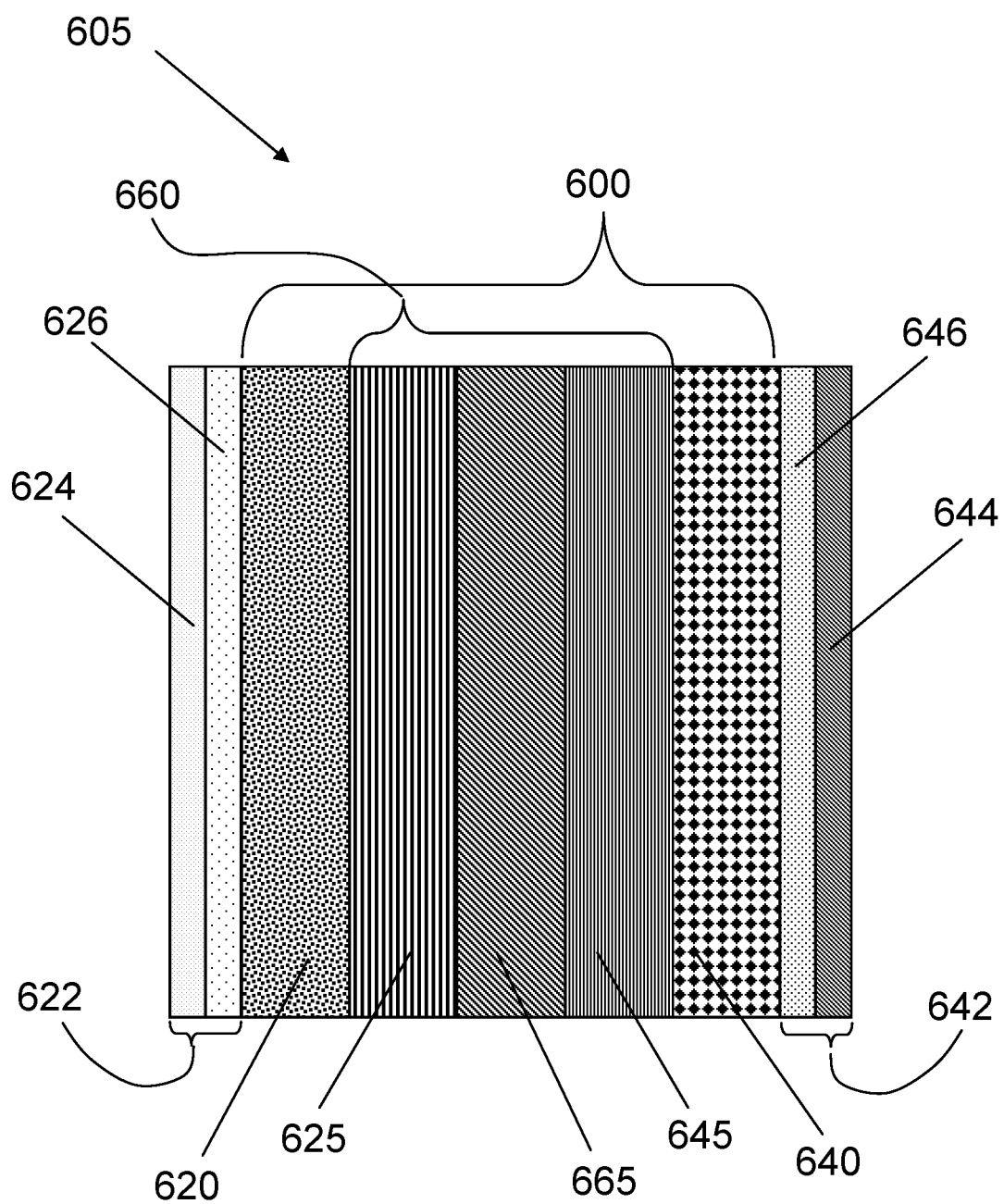
FIG. 6 is a schematic drawing that shows the major components of a CO$_x$ reduction reactor (CRR), according to an embodiment of the invention.

FIG. 6 is a schematic drawing that shows the major components of a $CO_x$ reduction reactor (CRR) 605, according to an embodiment of the invention.

The CRR 605 has a membrane electrode assembly 600 as described above in reference to FIG. 2. The membrane electrode assembly 600 has a cathode 620 and an anode 640, separated by an ion-exchange layer 660. The ion-exchange layer 660 can include three sublayers: a cathode buffer layer 625, a polymer electrolyte membrane 665, and an optional anode buffer layer 645. In addition, the CRR 605 has a cathode support structure 622 adjacent to the cathode 620 and an anode support structure 642 adjacent to the anode 640.

In one embodiment of the invention, the cathode 620 contains an ion-conducting polymer as described in Class A in Table 4 above, the anode 640 contains an ion-conducting polymer as described in Class C in Table 4 above, and the polymer electrolyte membrane 665 contains an ion-conducting polymer as described as Class C in Table 4 above. In one arrangement, the cathode buffer layer 625 contains at least two ion-conducting polymers: one as described in Class A and one as described in Class B in Table 4 above.

In another embodiment of the invention, the cathode 620 contains both an ion-conducting polymer as described in Class A and an ion-conducting polymer as described in Class B, the anode 640 contains an ion-conducting polymer as described in Class C, the polymer electrolyte membrane 665 contains an ion-conducting polymer as described in Class A, the cathode buffer layer 625 contains both an ion-conducting polymer as described in Class A and an ion-conducting polymer as described in Class B, and the anode buffer layer 645 contains an ion-conducting polymer as described in Class C. Other combinations of ion-conducting polymers are also possible.

The cathode support structure 622 has a cathode polar plate 624, usually made of graphite, to which a voltage can be applied. There can be flow field channels, such as serpentine channels, cut into the inside surfaces of the cathode polar plate 624. There is also a cathode gas diffusion layer 626 adjacent to the inside surface of the cathode polar plate 624. In some arrangements, there is more than one cathode gas diffusion layer (not shown). The cathode gas diffusion layer 626 facilitates the flow of gas into and out of the membrane electrode assembly 600. An example of a cathode gas diffusion layer 626 is a carbon paper that has a carbon microporous layer.

The anode support structure 642 has an anode polar plate 644, usually made of metal, to which a voltage can be applied. There can be flow field channels, such as serpentine channels, cut into the inside surfaces of the anode polar plate 644. There is also an anode gas diffusion layer 646 adjacent to the inside surface of the anode polar plate 644. In some arrangements, there is more than one anode gas diffusion layer (not shown). The anode gas diffusion layer 646 facilitates the flow of gas into and out of the membrane electrode assembly 600. An example of an anode gas diffusion layer 646 is a titanium mesh or titanium felt. In some arrangements, the gas diffusion layers 626, 646 are microporous.

There are also inlets and outlets (not shown) associated with the support structures 622, 642, which allow flow of reactants and products, respectively, to the membrane electrode assembly 600. There are also various gaskets (not shown) that prevent leakage of reactants and products from the cell.

In one embodiment of the invention, a direct current (DC) voltage is applied to the membrane electrode assembly 600 through the cathode polar plate 624 and the anode polar plate 642. Water is supplied to the anode 640 and is oxidized over an oxidation catalyst to form molecular oxygen ($O_2$), releasing protons (H+) and electrons (e−). The protons migrate through the ion-exchange layer 660 toward the cathode 620. The electrons flow through an external circuit (not shown). In one embodiment of the invention, the reaction is described as follows:

$$2H_2O \rightarrow 4H^+ + 4e^- + O_2$$

In other embodiments of the invention, other reactants can be supplied to the anode 640 and other reactions can occur. Some of these are listed in Table 3 above.

Figure 7:
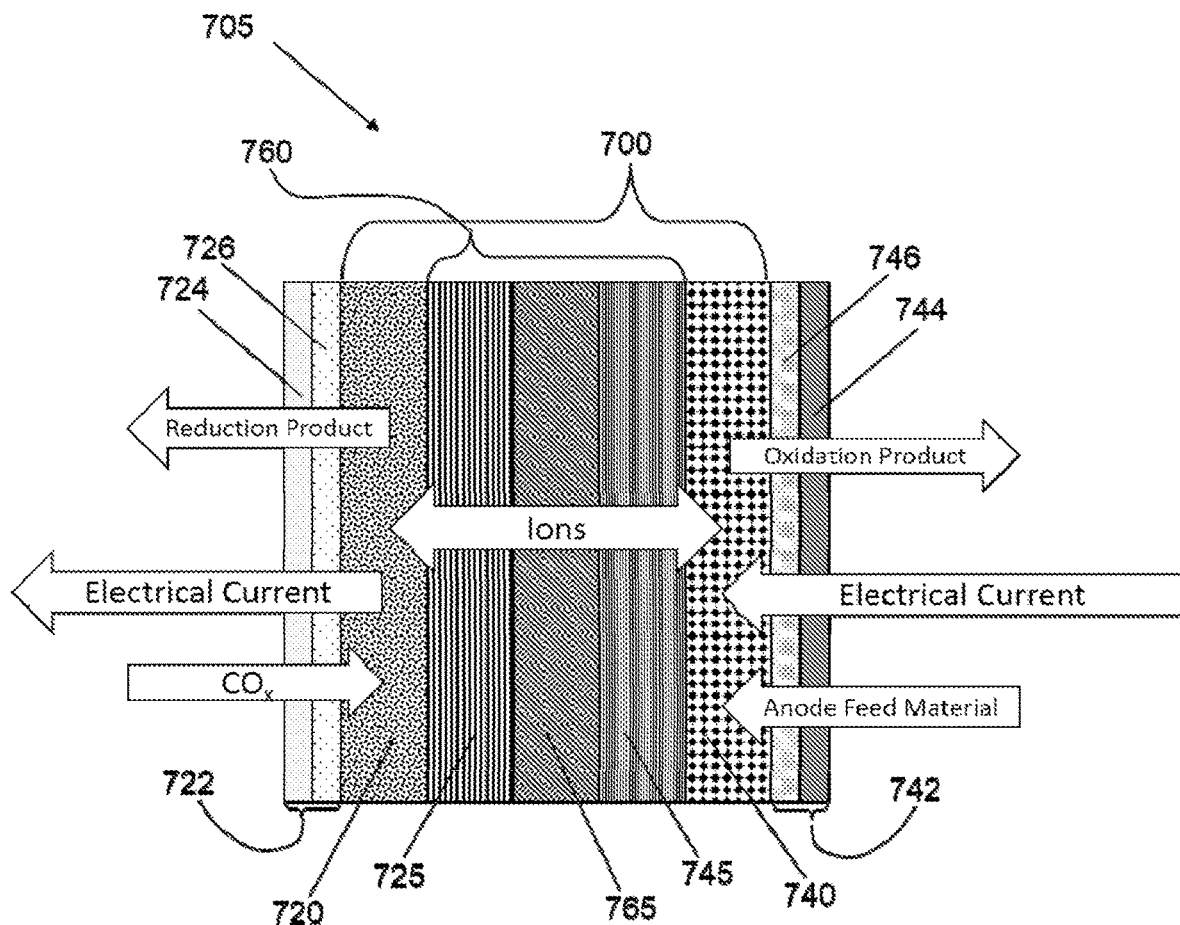
FIG. 7 is a schematic drawing that shows the major components of a CRR with arrows showing the flow of molecules, ions, and electrons according to one embodiment of the invention.

The flow of reactants, products, ions, and electrons through a CRR 705 reactor is indicated in FIG. 7, according to an embodiment of the invention.

The CRR 705 has a membrane electrode assembly 700 as described above in reference to FIG. 2. The membrane electrode assembly 700 has a cathode 720 and an anode 740, separated by an ion-exchange layer 760. The ion-exchange layer 760 can include three sublayers: a cathode buffer layer 725, a polymer electrolyte membrane 765, and an optional anode buffer layer 745. In addition, the CRR 705 has a cathode support structure 722 adjacent to the cathode 720 and an anode support structure 742 adjacent to the anode 740.

The cathode support structure 722 has a cathode polar plate 724, usually made of graphite, to which a voltage can be applied. There can be flow field channels, such as serpentine channels, cut into the inside surfaces of the cathode polar plate 724. There is also a cathode gas diffusion layer 726 adjacent to the inside surface of the cathode polar plate 724. In some arrangements, there is more than one cathode gas diffusion layer (not shown). The cathode gas diffusion layer 726 facilitates the flow of gas into and out of the membrane electrode assembly 700. An example of a cathode gas diffusion layer 726 is a carbon paper that has a carbon microporous layer.

The anode support structure 742 has an anode polar plate 744, usually made of metal, to which a voltage can be applied. There can be flow field channels, such as serpentine channels, cut into the inside surfaces of the anode polar plate 744. There is also an anode gas diffusion layer 746 adjacent to the inside surface of the anode polar plate 744. In some arrangements, there is more than one anode gas diffusion layer (not shown). The anode gas diffusion layer 746 facilitates the flow of gas into and out of the membrane electrode assembly 700. An example of an anode gas diffusion layer 746 is a titanium mesh or titanium felt. In some arrangements, the gas diffusion layers 726, 746 are microporous.

There are also inlets and outlets (not shown) associated with the support structures 722, 742, which allow flow of reactants and products, respectively, to the membrane electrode assembly 700. There are also various gaskets (not shown) that prevent leakage of reactants and products from the cell.

$CO_x$ is supplied to the cathode 720 and is reduced over $CO_x$ reduction catalysts in the presence of protons and electrons. The $CO_x$ can be supplied to the cathode 720 at pressures between 0 psig and 1000 psig or any other suitable range. The $CO_x$ can be supplied to the cathode 720 in concentrations below 100% or any other suitable percentage along with a mixture of other gases. In some arrangements, the concentration of $CO_x$ can be as low as approximately 0.5%, as low as 5%, or as low as 20% or any other suitable percentage.

In one embodiment of the invention, between approximately 10% and 100% of unreacted $CO_x$ is collected at an outlet adjacent to the cathode 720, separated from reduction reaction products, and then recycled back to an inlet adjacent to the cathode 720. In one embodiment of the invention, the oxidation products at the anode 740 are compressed to pressures between 0 psig and 1500 psig.

In one embodiment of the invention, multiple CRRs (such as the one shown in FIG. 6) are arranged in an electrochemical stack and are operated together. The CRRs that make up the individual electrochemical cells of the stack can be connected electrically in series or in parallel. Reactants are supplied to individual CRRs and reaction products are then collected.

Figure 8:
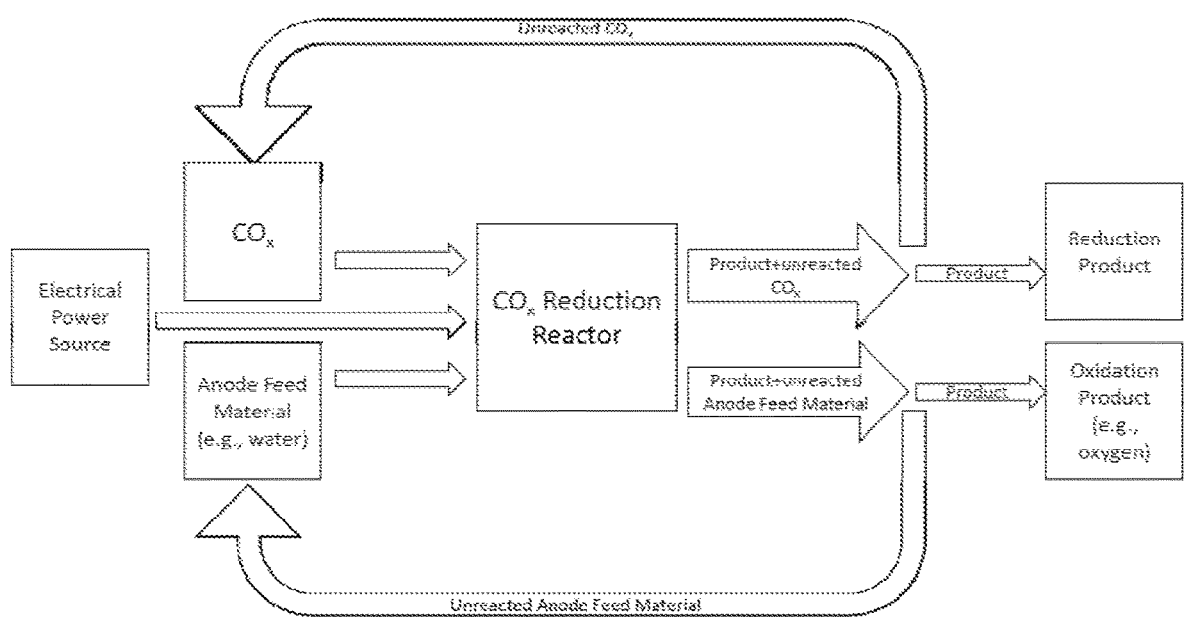
FIG. 8 is a schematic drawing that shows the major inputs and outputs of the CRR reactor.

The major inputs and outputs to the reactor are shown in FIG. 8. $CO_x$, anode feed material, and electricity are fed to the reactor. $CO_x$ reduction product and any unreacted $CO_x$ leave the reactor. Unreacted $CO_x$ can be separated from the reduction product and recycled back to the input side of the reactor. Anode oxidation product and any unreacted anode feed material leave the reactor in a separate stream. Unreacted anode feed material can be recycled back to the input side of the reactor.

Various catalysts in the cathode of a CRR cause different products or mixtures of products to form from $CO_x$ reduction reactions. Examples of possible $CO_x$ reduction reactions at the cathode are described as follows:

$$CO_2 + 2H^+ + 2e^- \rightarrow CO + H_2O$$

$$2CO_2 + 12H^+ + 12e^- \rightarrow CH_2CH_2 + 4H_2O$$

$$2CO_2 + 12H^+ + 12e^- \rightarrow CH_3CH_2OH + 3H_2O$$

$$CO_2 + 8H^+ + 8e^- \rightarrow CH_4 + 2H_2O$$

$$2CO + 8H^+ + 8e^- \rightarrow CH_2CH_2 + 2H_2O$$

$$2CO+8H^++8e^-\rightarrow CH_3CH_2OH+H_2O$$

$$CO+6H^++8e^-\rightarrow CH_4+H_2O$$

In another embodiment of the invention, a method of operating a $CO_x$ reduction reactor, as described in the embodiments of the invention above, is provided. It involves applying a DC voltage to the cathode polar plate and the anode polar plate, supplying oxidation reactants to the anode and allowing oxidation reactions to occur, supplying reduction reactants to the cathode and allowing reduction reactions to occur, collecting oxidation reaction products from the anode; and collecting reduction reaction products from the cathode.

In one arrangement, the DC voltage is greater than −1.2V. In various arrangements, the oxidation reactants can be any of hydrogen, methane, ammonia, water, or combinations thereof. In one arrangement, the oxidation reactant is water. In various arrangements, the reduction reactants can be any of carbon dioxide, carbon monoxide, and combinations thereof. In one arrangement, the reduction reactant is carbon dioxide.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A membrane electrode assembly comprising:
a cathode layer comprising a reduction catalyst and a first anion-and-cation-conducting polymer;
an anode layer comprising an oxidation catalyst and a first cation-conducting polymer;
a membrane layer comprising a second cation-conducting polymer, the membrane layer arranged between the cathode layer and the anode layer and conductively connecting the cathode layer and the anode layer; and
a cathode buffer layer comprising a second anion-and-cation-conducting polymer, the cathode buffer layer arranged between the cathode layer and the membrane layer and conductively connecting the cathode layer and the membrane layer.

2. The membrane electrode assembly of claim 1, cathode buffer layer further comprising FumaSep FAA-3.

3. The membrane electrode assembly of claim 2, the cathode layer further comprising FumaSep FAA-3.

4. The membrane electrode assembly of claim 3, wherein the second cation-conducting polymer is selected from a group consisting of Nafion 115, Nafion 117, and Nafion 211.

5. A membrane electrode assembly comprising:
a cathode layer comprising a reduction catalyst and a first anion-and-cation-conducting polymer;
an anode layer comprising an oxidation catalyst and a first cation-conducting polymer;
a membrane layer comprising a second cation-conducting polymer, the membrane layer arranged between the cathode layer and the anode layer and conductively connecting the cathode layer and the anode layer; and
a cathode buffer layer comprising FumaSep FAA-3, the cathode buffer layer arranged between the cathode layer and the membrane layer and conductively connecting the cathode layer and the membrane layer.

6. The membrane electrode assembly of claim 5, wherein the cathode buffer layer further comprises a second anion-and-cation-conducting polymer, wherein the first and second anion-and-cation-conducting polymers comprise polyethylene glycol.

7. The membrane electrode assembly of claim 5, wherein the cathode layer further comprises FumaSep FAA-3.

8. The membrane electrode assembly of claim 5, wherein the first cation-conducting polymer comprises tetrafluoroethylene-perfluoro-3,6-dioxa-4-methyl-7-octenesulfonic acid copolymer.

9. The membrane electrode assembly of claim 8, wherein the second cation-conducting polymer comprises tetrafluoroethylene-perfluoro-3,6-dioxa-4-methyl-7-octenesulfonic acid copolymer.

10. A membrane electrode assembly comprising:
a cathode layer comprising a reduction catalyst, a first anion-and-cation-conducting polymer, and FumaSep FAA-3;
an anode layer comprising an oxidation catalyst and a first cation-conducting polymer; and
a membrane layer comprising a second cation-conducting polymer, the membrane layer arranged between the cathode layer and the anode layer and conductively connecting the cathode layer and the anode layer.

11. The membrane electrode assembly of claim 10, further comprising a cathode buffer layer, comprising a first anion-conducting polymer, arranged between the cathode layer and the membrane layer and conductively connecting the cathode layer and the membrane layer.

12. The membrane electrode assembly of claim 11, wherein the first anion-conducting polymer comprises FumaSep FAA-3.

13. The membrane electrode assembly of claim 10, wherein the second cation-conducting polymer is selected from a group consisting of Nafion 115, Nafion 117, and Nafion 211.

14. The membrane electrode assembly of claim 13, further comprising a cathode buffer layer, comprising a first anion-conducting polymer, arranged between the cathode layer and the membrane layer and conductively connecting the cathode layer and the membrane layer.

15. The membrane electrode assembly of claim 14, wherein the first anion-conducting polymer comprises FumaSep FAA-3.

16. A membrane electrode assembly comprising:
a cathode layer comprising a reduction catalyst and FumaSep FAA-3;
an anode layer comprising an oxidation catalyst, and a first cation-conducting polymer;
a membrane layer arranged between the cathode layer and the anode layer and conductively connecting the cathode layer and the anode layer, the membrane layer comprising a second cation-conducting polymer; and
a cathode buffer layer comprising FumaSep FAA-3, the cathode buffer layer arranged between the cathode layer and the membrane layer and conductively connecting the cathode layer and the membrane layer;
wherein at least one of the cathode layer and the cathode buffer layer further comprises a first anion-and-cation-conducting polymer.

17. The membrane electrode assembly of claim 16, wherein the second cation-conducting polymer is selected from a group consisting of Nafion 115, Nafion 117, and Nafion 211.

18. The membrane electrode assembly of claim 16, wherein the cathode buffer layer comprises the first anion-and-cation-conducting polymer.

19. The membrane electrode assembly of claim 16, wherein the cathode layer comprises the first anion-and-cation-conducting polymer.

20. The membrane electrode assembly of claim 19, wherein the cathode buffer layer further comprises a second anion-and-cation-conducting polymer.

21. The membrane electrode assembly of claim 20, wherein the second cation-conducting polymer is selected from a group consisting of Nafion 115, Nafion 117, and Nafion 211.

22. The membrane electrode assembly of claim 16, wherein the cathode layer comprises the first anion-and-cation-conducting polymer and the cathode buffer layer further comprises the first anion-and-cation-conducting polymer.

* * * * *